Dec. 23, 1924.

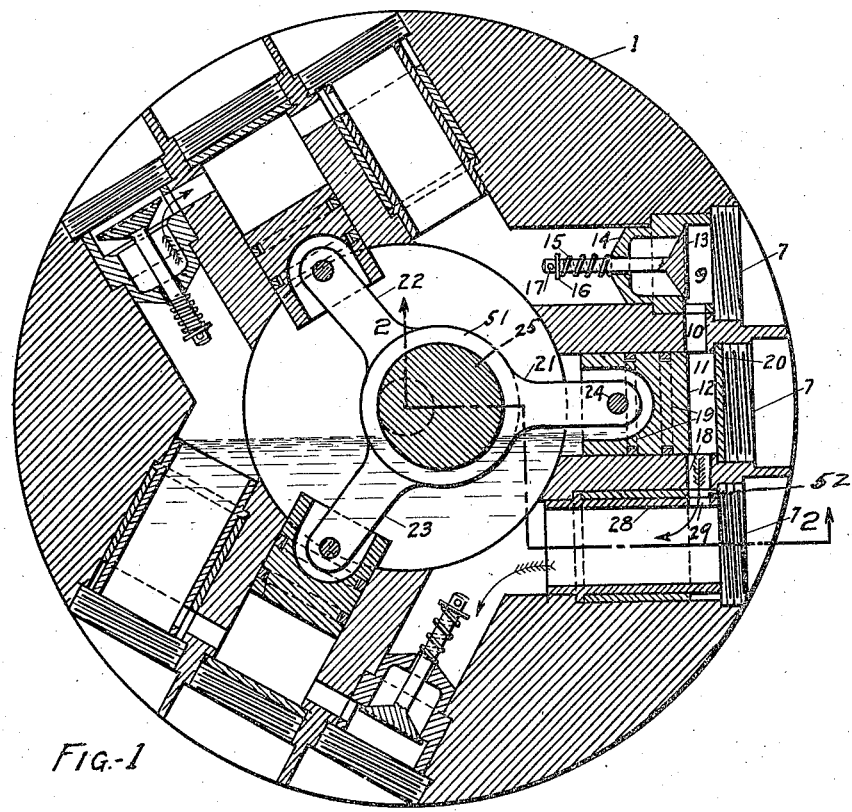

E. E. FLUKE 1,520,056

FLUID TRANSMISSION

Filed Feb. 11, 1924    2 Sheets-Sheet 2

INVENTOR:-
E. E. Fluke

Patented Dec. 23, 1924.

1,520,056

UNITED STATES PATENT OFFICE.

EDWARD E. FLUKE, OF BEARCREEK, MONTANA.

FLUID TRANSMISSION.

Application filed February 11, 1924. Serial No. 691,919.

*To all whom it may concern:*

Be it known that I, EDWARD E. FLUKE, citizen of the United States, residing at Bearcreek, in the county of Carbon and State of Montana, have invented certain new and useful Improvements in Fluid Transmissions, of which the following is a specification.

This invention relates to fluid transmission mechanisms, also known as "hydraulic clutches", and particularly to that type thereof in which a body of the fluid circulates between a driving and a driven element in consequence of the reciprocation of pistons, the circulation or flow being controlled by valves, whereby, when the valves are closed the flow is stopped and the parts are locked to each other, or when the valves are open more or less the flow is correspondingly permitted and more or less motion or power is transmitted.

The invention is characterized particularly by improvements with respect to the valve mechanism and the means for operating and controlling the same, and also with respect to certain details permitting convenient access to the pump cylinders and the valves.

Figure 3:
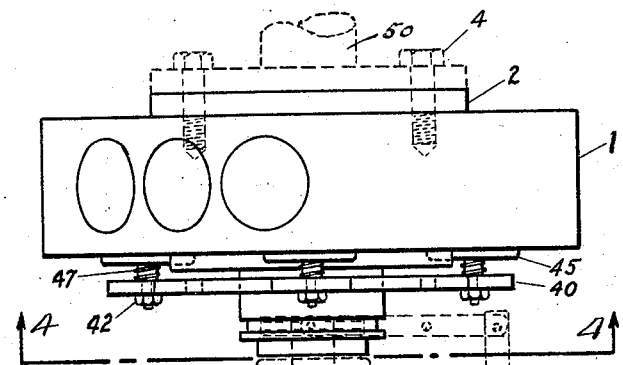
Figure 5:
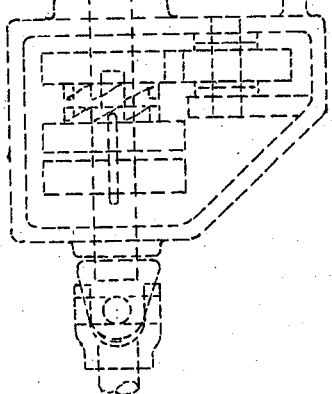
Figure 4:
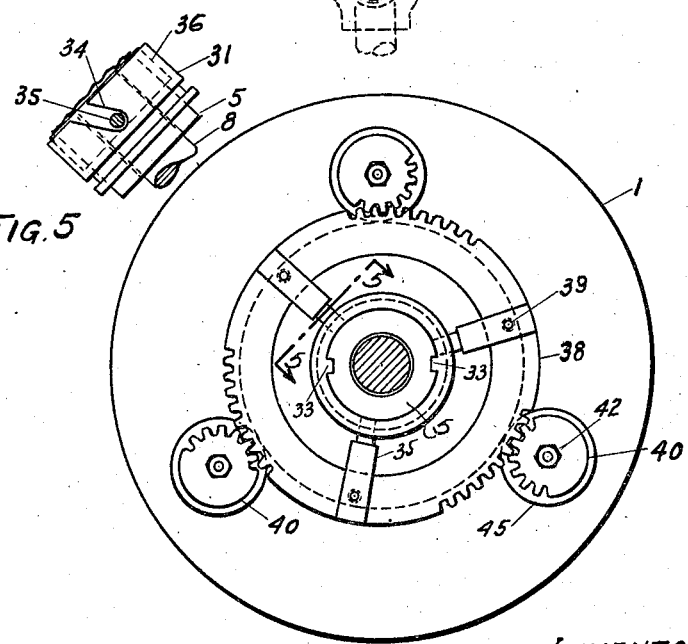

The invention is illustrated in the accompanying drawings in which Fig. 1 is a section on the line 1—1 of Fig. 2. Fig. 2 is a half section plan on the line 2—2 of Fig. 1. Fig. 3 is a plan showing the device applied. Fig. 4 is an end elevation on the line 4—4 of Fig. 3. Fig. 5 is a detail on the line 5—5 of Fig. 4, showing the operating collar.

Referring specifically to the drawings, 1 indicates a circular cylinder block closed at one side by a plate 2 which contains the ball bearings 3 for the free end of the shaft 8 which may be the driven shaft, the plate 2 being fixed to the block 1 by stud bolts 4. The opposite side of the block is closed by a hub 5 which is fastened to the block by the stud 6. The cylinders are cored radially in the block, and the valve chambers are also cored therein beside and parallel to the cylinders. The cylinders and chambers open at one end into a central circular cavity of the block, and extend thru to the periphery of the block, the outer ends being closed by screw plugs 7, which are easily removable to permit access to the interior. The cylinder block is thus made oiltight and is about half filled with oil or other fluid. The cylinder block may be driven around the driven shaft 8 by a driving shaft 50 attached to the plate 2 by the studs 4.

Each cylinder 11 contains a piston 12 provided with suitable rings 19 and connected by a wrist pin 24 to a connecting rod such as 21, 22 or 23 projecting from an eccentric band 51 mounted on an eccentric 25 which may be integral with or fixed to the shaft 8, so that the pistons reciprocate in the cylinders when the block is rotated.

Each inlet valve chamber 9 opens thru a port 10 into the outer end of the cylinder, and contains a poppet valve 13 which closes against a seat on a bushing 14 which also guides the valve stem, which is provided with a spring 15 retained by a washer 16 and pin 17 tending to close the valve. The outlet port 18 from each cylinder opens thru a port 29 into a tubular bushing 28 set in the outlet valve casing and controlled by a sliding sleeve valve 30 which slides in the space between the bushing and the wall of the valve chamber, this sleeve covering or uncovering the opening 29 to control the flow from the pump cylinder, as shown at 52.

The sleeve valve 30 is shifted or moved radially by means of a crank pin or lug 44 on a disk 43 at the end of a stem 41 which is set in a sleeve formed on a plate 45 bolted as at 46 to the side of the cylinder block. The valve 30 can also turn to the extent required by the angular movement of lug 44. The stem 41 carries a gear 40 which is secured thereto by a nut 42, and the disk is held close to the sleeve by a spring 47 in compression between the gear 40 and the plate or collar 45. Each gear 40 meshes with teeth on a gear 38 which is turned by means of a collar 31 which may be shifted axially on the hub 5 by means of any suitable shifter engaging in the groove 32 in the collar. The collar 31 has lugs 33 which fit in keyways in the hub 5 to prevent the collar from rotating around the hub and has three diagonal slots 34 into which project the ends of the pins or arms 35 which are fixed by bolts 39 to the gear 38.

By shifting the collar 31 back and forth on the hub the arms 35 traveling in the slots 34 turn the gear 38 one way or the other, and this turns the pinions 40 and stems 41 and the crank connections at 44 shift the valves 30 more or less and thereby control the outlets from the pump cylinders.

As the block is rotated the fluid is forced by centrifugal action to the outer part of the fluid chamber, and as the pistons operate the fluid is drawn thru the inlet valves 13 into the pump cylinders and forced out thru the bushing 28, the circulation as shown by the arrows being from the outlet port of one cylinder to the inlet valve of the other and so around the block, and under such conditions no power is transmitted. By closing the valves 30 in the manner described, the circulation is obstructed more or less and power is accordingly transmitted to the shaft 8. When the valves 30 are completely closed, circulation is prevented and the driving and driven parts are locked to each other, the full speed of the driving parts being thus transmitted to the driven shaft.

The device will be found very useful in automobile driving gear, but may of course be applied to any machine to which a change speed fluid transmission is suitable. The invention is not limited to the special form shown, but may be embodied in various modifications thereof.

I claim:

1. In a fluid transmission, the combination of a hollow cylinder block having radial cylinders therein, a shaft projecting into the block, pistons working in the cylinders and operatively connected to the shaft, and inlet and outlet valves between the cylinders and the hollow of the block, the outlet valves comprising sliding sleeves, and tubular bushings communicating between the cylinders and the interior of the block, said bushings having ports controlled by the sleeves which are mounted on the bushings, and means to operate said sleeves from the exterior of the block.

2. In a fluid transmission, the combination of a hollow cylinder block having radial cylinders therein, a shaft projecting into the block, pistons working in the cylinders and operatively connected to the shaft, and inlet and outlet valves between the cylinders and the hollow of the block, the outlet valves comprising sliding sleeves, and means to operate said sleeves from the exterior of the block, the means for operating the sleeves including turning stems extending thru the side of the block and provided with crank devices at their inner ends engaging said sleeve valves, and means connected to their outer end to turn said stems.

3. In a fluid transmission, the combination of a block having a cylinder therein, a shaft extending into the block, and a piston working in the cylinder and operatively connected to the shaft, an outlet valve chamber communicating with the cylinder and with the interior of the block, a tubular bushing in said chamber and having a port, a sleeve valve working between the bushing and the wall of the chamber and controlling said port, and exterior means to shift the valve.

In testimony whereof, I affix my signature in presence of two witnesses.

EDWARD E. FLUKE.

Witnesses:
J. G. FORNEY,
H. B. CAMP.